US012626345B2

(12) United States Patent
Sneddon

(10) Patent No.: US 12,626,345 B2
(45) Date of Patent: May 12, 2026

(54) F-STAT STATISTICAL DETECTION OF DIGITAL IMAGE TAMPERING

(71) Applicant: Booz Allen Hamilton Inc., McLean, VA (US)

(72) Inventor: Robert Shaw Sneddon, Alexandria, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 279 days.

(21) Appl. No.: 18/481,463

(22) Filed: Oct. 5, 2023

(65) Prior Publication Data

US 2025/0117908 A1     Apr. 10, 2025

(51) Int. Cl.
G06T 7/00       (2017.01)
G06F 16/583     (2019.01)
G06T 11/00      (2006.01)

(52) U.S. Cl.
CPC .......... G06T 7/0002 (2013.01); G06F 16/583 (2019.01); G06T 11/001 (2013.01)

(58) Field of Classification Search
CPC .... G06T 7/0002; G06T 11/001; G06F 16/583
See application file for complete search history.

(56) References Cited

U.S. PATENT DOCUMENTS

| 7,643,699 | B2 | 1/2010 | Lim et al. |
| 9,760,973 | B2 | 9/2017 | Bayram et al. |
| 11,288,537 | B2 | 3/2022 | Mccloskey et al. |
| 2018/0130241 | A1* | 5/2018 | Sunkavalli ............... G06T 5/77 |
| 2022/0084223 | A1 | 3/2022 | Norris et al. |

FOREIGN PATENT DOCUMENTS

| CN | 112330632 A | 2/2021 |
| CN | 114066965 A | 2/2022 |
| CN | 114612411 A | 6/2022 |

(Continued)

OTHER PUBLICATIONS

NPL: Results Publication Date Range: Jan. 19, 2006 to May 22, 2025.*

(Continued)

*Primary Examiner* — Quang N Vo
(74) *Attorney, Agent, or Firm* — Buchanan Ingersoll & Rooney PC

(57)                ABSTRACT

Embodiments relate to a digital image file alteration detection controller which implements a processor configuration to efficiently detect an alteration to a digital image file. The digital image file alteration detection controller can include a processor, and a memory associated with the processor, the memory including instructions stored thereon that when executed by the processor will cause the processor to: extract Photo Response Non-Uniformity (PRNU) data of a digital image file received from the memory; determine a local variability representing a variability in PRNU data for a locale of a digital image file; determine a global variability representing a variability in PRNU data for an entire digital image file; compare local variability to global variability; and generate an alteration detection indicator indicative of an alteration detected when the local variability to global variability comparison is less than a threshold value.

20 Claims, 4 Drawing Sheets

(56)          References Cited

FOREIGN PATENT DOCUMENTS

| | | | |
|---|---|---|---|
| CN | 115223217 A | 10/2022 | |
| CN | 115587994 A | * 1/2023 | ........... G06T 7/0002 |

OTHER PUBLICATIONS

NPL: IP.com and IEEE, Results Publication Date Range: Jan. 19, 2006 to Dec. 4, 2025.*

Debiasi et al., "PRNU Variance Analysis for Morphed Face Image Detection", 2018.

Tan et al. "PRNU-based Image Forgery Localization With Convolutional Neural Network" 2022.

* cited by examiner

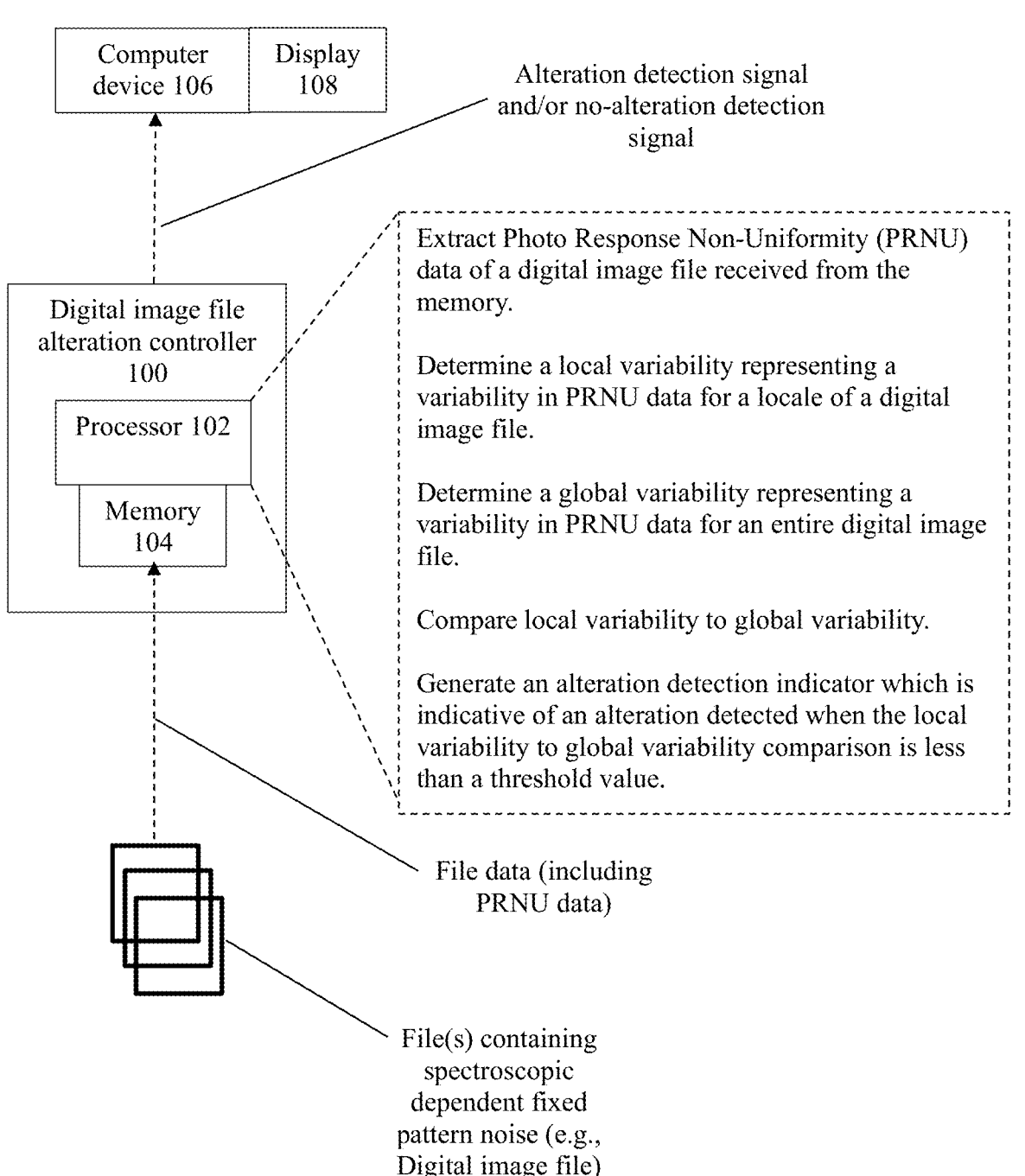

Computer device 106 | Display 108

Alteration detection signal and/or no-alteration detection signal

Digital image file alteration controller 100

Processor 102

Memory 104

Extract Photo Response Non-Uniformity (PRNU) data of a digital image file received from the memory.

Determine a local variability representing a variability in PRNU data for a locale of a digital image file.

Determine a global variability representing a variability in PRNU data for an entire digital image file.

Compare local variability to global variability.

Generate an alteration detection indicator which is indicative of an alteration detected when the local variability to global variability comparison is less than a threshold value.

File data (including PRNU data)

File(s) containing spectroscopic dependent fixed pattern noise (e.g., Digital image file)

FIG. 1

- Imagery data is from World View 2 and 3 satellite, basic or panchromatic.
- Example of tampered image, and the heat map of detection.
 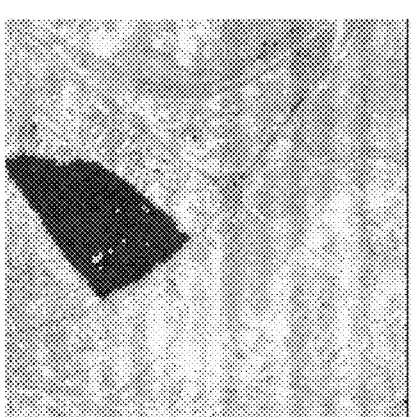
FIG. 4

F-STAT STATISTICAL DETECTION OF DIGITAL IMAGE TAMPERING

STATEMENT CONCERNING FEDERALLY SPONSORED RESEARCH

This invention was made with government support under Contract No. GS00Q14OADU406 (Task Order No. HM047618F0198). The Government has certain rights in the invention.

FIELD

Embodiments relate to methods and systems to detect digital image forgeries or tampering of a digital image.

BACKGROUND INFORMATION

Known system and methods are deficient in that they lack a robust technique for detecting alterations of the PRNU of a digital image. Known systems and methods can be appreciated from CN 112330632 to Quan et al., CN 114066965 to Tan et al., CN 114612411 to Han et al., CN 115223217 to Liu et al., U.S. Pat. No. 7,643,699 to Lim et al., U.S. Pat. No. 9,760,973 to Bayram et al., U.S. Pat. No. 11,288,537 to McCloskey et al., US 2022/0084223 by Norris et al., Debiasi, L., Rathgeb, C., Scherhag, U., Uhl, A., & Busch, C. (2018 October). "PRNU Variance Analysis for Morphed Face Image Detection", and Tan, Q., Qi, S., Zhang, Y., & Xue, M. (2022 September). "PRNU-based Image Forgery Localization With Convolutional Neural Network"

SUMMARY

Embodiments can relate to a digital image file alteration detection controller which implements a processor configuration to efficiently detect an alteration to a digital image file. The digital image file alteration detection controller can include a processor, and a memory associated with the processor. The memory can include instructions stored thereon that when executed by the processor will cause the processor to extract Photo Response Non-Uniformity (PRNU) data of a digital image file received from the memory. The instructions will cause the processor to determine a local variability representing a variability in PRNU data for a locale of a digital image file. The instructions will cause the processor to determine a global variability representing a variability in PRNU data for an entire digital image file. The instructions will cause the processor to compare local variability to global variability. The instructions will cause the processor to generate an alteration detection indicator indicative of an alteration detected when the local variability to global variability comparison is less than a threshold value.

Embodiments can relate to a method for managing a processor configuration to efficiently detect an alteration to a digital image file. The method can involve extracting Photo Response Non-Uniformity (PRNU) data of a digital image file. The method can involve determining a local variability representing a variability in PRNU data for a locale of a digital image file. The method can involve determining a global variability representing a variability in PRNU data for an entire digital image file. The method can involve comparing a local variability to global variability. The method can involve generating an alteration detection indicator indicative of an alteration detected when the local variability to global variability comparison is less than a threshold value.

Embodiments can relate to a computer readable medium including instructions stored thereon that when executed by a processor will cause the processor to efficiently detect an alteration to a digital image file. The instructions will cause the processor to extract Photo Response Non-Uniformity (PRNU) data of a digital image file or a similar type of noise which is dependent on the response properties a spectroscopic type of sensor. The instructions will cause the processor to determine a local variability representing a variability in PRNU data for a locale of a digital image file. The instructions will cause the processor to determine a global variability representing a variability in PRNU data for an entire digital image file. The instructions will cause the processor to compare a local variability to global variability. The instructions will cause the processor to generate an alteration detection indicator indicative of an alteration detected when the local variability to global variability comparison is less than a threshold value.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIG. 1 shows an exemplary digital image file alteration detection controller;

FIG. 4 shows an exemplary heat map for a digital image file.

DETAILED DESCRIPTION

Embodiments can relate to a controller, a system, and/or a method for detecting alteration of a file. The file can include spectroscopic dependent fixed pattern noise (e.g., the production of Photo Response Non-Uniformity (PRNU)). A digital image can be an example of such file. As a non-limiting example, the file can be output from a scanner that uses one or more spectroscopic sensors. Embodiments can be used to detect an alteration to the file so as to detect whether the file is a forgery, had been tampered with, or altered in any way. With a digital image file, for example, the digital image has an underlying noise layer created by a digital sensor. This noise layer is called the PRNU. When a digital image is altered by the addition of pixels to the image, for example, the PRNU is altered because those added pixels are not created in the same way as the original image—i.e., their PRNU noise is not the same. Thus, tampering of an image can be detected by identifying abnormalities (e.g., irregularities in the PRNU's composition) in the image's PRNU. One way to identify irregularities in such data is by identifying changes in the variability in the PRNU data. There are normal or expected variability in the PRNU, but the techniques disclosed herein are used to detect changes in the variability that can be used as indicators of abnormal PRNU irregularities. Thus, embodiments herein can involve extracting PRNU from a file (e.g., a digital image file) and measuring changes in local variability of the PRNU in relation to a global variability of the file.

Figure 2:
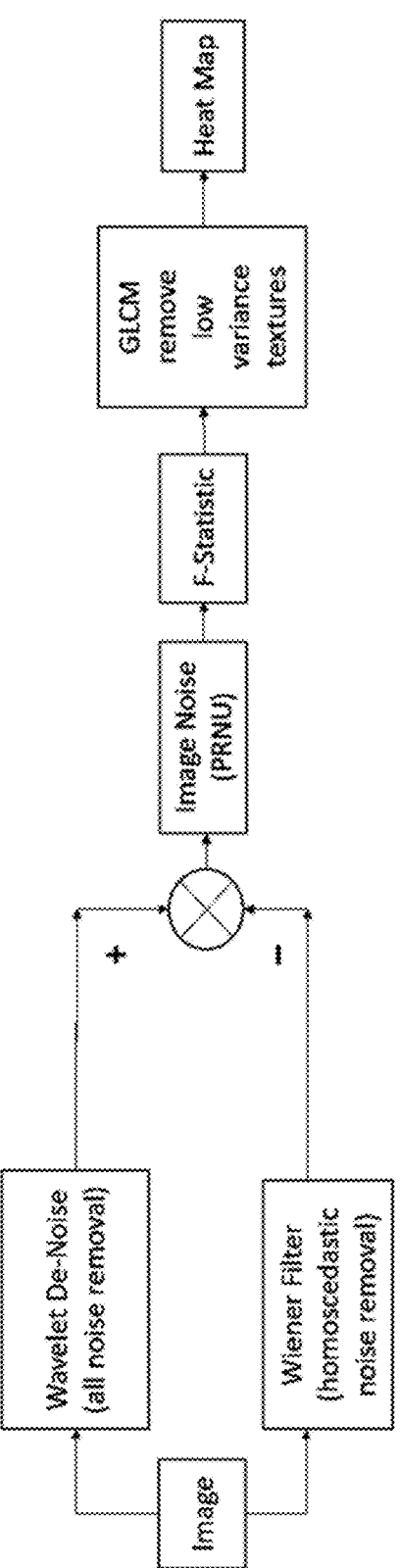
FIG. 2 shows an exemplary F-STAT technique that can be used to detect an alteration to a digital image file.

Referring to FIGS. 1-2, an exemplary embodiment can relate to a digital image file alteration detection controller 100. The digital image file alteration detection controller 100 can be configured to implement a processor configuration to efficiently detect an alteration to a digital image file. While exemplary embodiments discuss use of the digital image file alteration detection controller 100 operating on a digital image file, it is understood that the file can be any file that has spectroscopic dependent fixed pattern noise. The digital image file alteration detection controller 100 can include one or more processors 102. The digital image file alteration detection controller 100 can include one or more memories 104. Any number of the memories 104 can be associated with any number of processors 102. Being "associated with" as used in this disclosure can include two or more components being in operative association with each other so as to communication with each other (which can be via hardware or wireless communication). The memory 104 can include instructions stored thereon that when executed by the processor 102 can cause the processor 102 to perform one or more of the functions disclosed herein.

Any of the processors disclosed herein can be part of or in communication with a machine (e.g., a computer device, a logic device, a circuit, an operating module (hardware, software, and/or firmware), etc.). The processor can be hardware (e.g., processor, integrated circuit, central processing unit, microprocessor, core processor, computer device, etc.), firmware, software, etc. configured to perform operations by execution of instructions embodied in computer program code, algorithms, program logic, control, logic, data processing program logic, artificial intelligence programming, machine learning programming, artificial neural network programming, automated reasoning programming, etc. The processor can receive, process, and/or store data.

Any of the processors disclosed herein can be a scalable processor, a parallelizable processor, a multi-thread processing processor, etc. The processor can be a computer in which the processing power is selected as a function of anticipated network traffic (e.g., data flow). The processor can include an integrated circuit or other electronic device (or collection of devices) capable of performing an operation on at least one instruction, which can include a Reduced Instruction Set Core (RISC) processor, a Complex Instruction Set Computer (CISC) microprocessor, a Microcontroller Unit (MCU), a CISC-based Central Processing Unit (CPU), a Digital Signal Processor (DSP), a Graphics Processing Unit (GPU), a Field Programmable Gate Array (FPGA), etc. The hardware of such devices may be integrated onto a single substrate (e.g., silicon "die"), distributed among two or more substrates, etc. Various functional aspects of the processor may be implemented solely as software or firmware associated with the processor.

The processor can include one or more processing or operating modules. A processing or operating module can be a software or firmware operating module configured to implement any of the functions disclosed herein. The processing or operating module can be embodied as software and stored in memory, the memory being operatively associated with the processor. A processing module can be embodied as a web application, a desktop application, a console application, etc.

The processor can include or be associated with a computer or machine readable medium. The computer or machine-readable medium can include memory. Any of the memory discussed herein can be computer readable memory configured to store data. The memory can include a volatile or non-volatile, transitory or non-transitory memory, and be embodied as an in-memory, an active memory, a cloud memory, etc. Examples of memory can include flash memory, Random Access Memory (RAM), Read Only Memory (ROM), Programmable Read only Memory (PROM), Erasable Programmable Read only Memory (EPROM), Electronically Erasable Programmable Read only Memory (EEPROM), FLASH-EPROM, Compact Disc (CD)-ROM, Digital Optical Disc DVD), optical storage, optical medium, a carrier wave, magnetic cassettes, magnetic tape, magnetic disk storage or other magnetic storage devices, or any other medium which can be used to store the desired information and which can accessed by the processor.

The memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, transmission media, etc. The computer or machine readable medium can be configured to store one or more instructions thereon. The instructions can be in the form of algorithms, program logic, etc. that cause the processor to execute any of the functions disclosed herein.

Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc. Communications can be via Bluetooth, near field communications, cellular communications, telemetry communications, Internet communications, etc.

Transmission of data and signals can be via transmission media. Transmission media can include coaxial cables, copper wire, fiber optics, etc. Transmission media can also take the form of acoustic or light waves, such as those generated during radio-wave and infrared data communications, or other form of propagated signals (e.g., carrier waves, digital signals, etc.).

Any of the processors can be in communication with other processors of other devices (e.g., a computer device, a computer system, a laptop computer, a desktop computer, etc.). For instance, the processor of the digital image file alteration detection controller 100 can be in communication with a processor of a computer device 106, the processor of the computer device 106 can be in communication with a processor of a display 108, etc. Any of the processors can have transceivers or other communication devices/circuitry to facilitate transmission and reception of wireless signals. Any of the processors can include an Application Programming Interface (API) as a software intermediary that allows two or more applications to talk to each other. Use of an API can allow software of one processor to communicate with software of another processor of another device(s).

Any of the data or communication transmissions between two components can be a push operation and/or a pull operation. For instance, data transfer between the processor 102 and the memory 104 can be push operation (e.g., the data can be pushed from the memory) and/or a pull operation (e.g., the processor can pull the data from the memory), data transfer between the controller 100 and the computer device 106 can be a push and/or pull operation, etc.

Instructions stored on the memory 104, when executed by the processor 102, can cause the processor 102 to extract PRNU data of file that includes spectroscopic dependent fixed pattern noise. The file can be a digital image file, for example. Thus, the processor 102 can extract PRNU data of a digital image file. The digital image file can be a file that had been received and stored in the memory 104 associated with the processor 102, a file that is retrieved from a different memory, etc. The digital image file can be scanned with one or more spectroscopic sensors to receive intensity strength (or signal strength) data related to the PRNU, wherein PRNU extraction can be achieved via filtering, denoising, etc. techniques. This can be done before being retrieved by the processor 102 or done by the processor 102. The extracted PRNU data can be stored in the memory 104 for further processing. In addition, the PRNU data can be encoded, tagged, or labeled before, during, or after being stored in memory 104.

Instructions stored on the memory 104, when executed by the processor 102, can cause the processor 102 to determine a local variability representing a variability in PRNU data for a locale of a digital image file. Variability can be a measure of how much, how frequent, to what degree, etc. the PRNU data changes for a region of the file. A locale can be a zone of a digital image file that includes plural pixels. The determination of which zone(s) to use, how big the zone(s) is/are, how many locales to determine a local variability for, etc. can be set by design criteria, optimization factors, computational resources, processing speed, etc. The variability can be a variability in signal strength of the PRNU data, for example. The local variability for one or more locales can be stored in the memory 104 for further processing. In addition, the local variability can be encoded, tagged, or labeled before, during, or after being stored in memory 104.

Instructions stored on the memory 104, when executed by the processor 102, can cause the processor 102 to determine a global variability representing a variability in PRNU data for an entire digital image file. While it is contemplated to determine global variability by measuring variability for the entire digital image file, the global variability can be for a region that is larger than a locale—e.g., the "global" region may or may not be the entire digital image file. Variability can be a measure of how much, how frequent, to what degree, etc. the PRNU data changes for a "global" region of the file. A "global" region can be a zone of a digital image file that includes plural locales. The determination of which zone(s) to use, how big the zone(s) is/are, how many "global" regions to determine a local variability for, etc. can be set by design criteria, optimization factors, computational resources, processing speed, etc. The variability can be a variability in signal strength of the PRNU data, for example. The global variability for one or more "global" regions can be stored in the memory 104 for further processing. In addition, the global variability can be encoded, tagged, or labeled before, during, or after being stored in memory 104.

Instructions stored on the memory 104, when executed by the processor 102, can cause the processor 102 to compare local variability to global variability. This comparison can, be based on a value similar to an F-statistic ("FSTAT") technique, for example. The comparison can be for one or more locales and one or more "global" regions. In an exemplary embodiment, a local variability is determined for one or more locales and a global variability is determined for the entire digital file. Then a local variability to global variability comparison is done for each individual locale. For instance, a local variability is determined for locale-1, a local variability is determined for locale-2, a local variability is determined for locale-3, etc. A local variability to global variability comparison is made for locale-1 as compared to the global variability, a local variability to global variability comparison is made for locale-2 as compared to the global, a local variability to global variability comparison is made for locale-3 as compared to the global variability, etc.—e.g., the global variability is the same value for each comparison. It is understood that the above is described as a non-limiting example—e.g., the global variability may not be the same value for each comparison. The measure of variability in a locale may be a measure of one or more of magnitude, degree, frequency, etc., and the measure of variability in a "global" region may be a measure of one or more of magnitude, degree, frequency, etc. The measure(s) for an one locale may be the same as or different from the measure(s) of another locale, the measure(s) for an one "global" region may be the same as or different from the measure(s) of another "global" region, the measure(s) for a locale(s) used in a comparison may be the same as or different from the measure(s) for the "global" region(s) used in the comparison, etc. While it is contemplated for the locale(s) used in the comparison to be locale(s) located within the "global" region(s) used in the comparison, it/they may not be.

Instructions stored on the memory 104, when executed by the processor 102, can cause the processor 102 to generate an alteration detection indicator (e.g., an electric signal, an audio signal, a visual signal, etc.) indicative of an alteration detected when the local variability to global variability comparison is less than a threshold value. With an F-statistic technique, it is assumed that a central tendency value of a given data set will be normally distributed. Thus, under this technique, a variance measure for each data should all be the same. If it is not, then there is something amiss (e.g., tampering occurred). Accordingly, a threshold value can be used to assess an abnormal variability-detect abnormalities in the PRNU, detect irregularities in the composition of the PRNU, detect extreme changes in the variance of the PRNU, etc.

It is noted that the comparison assesses the magnitude, degree, frequency, etc. of PRNU data variability of a locale to that of a global variability. This comparison allows one to determine if the PRNU data in the locale has a variability that is statistically different from that of the global. If so, then that is an indicator that the file had been altered in that locale. The exemplary embodiment generates an alteration detection indicator when the comparison is less than a threshold value, but it can be generated with the comparison is greater than a threshold value, equal to a threshold value, within a range of a threshold value, etc. In the exemplary embodiment, the comparison is division operation in which local variability is divided by a global variability. If the local variability is small compared to that of the global variability, this can be an indicator that the pixels in the locale had been altered. In the case of a division operation for the comparator operator, the resultant comparison value gets smaller the more there is evidence of tampering. Thus, the processor 102 can generate an alteration detection indicator indicative of an alteration detected when the local variability to global variability comparison is less than a threshold value. As noted above, the variability can be a variability in signal strength of the PRNU data, for example. The alteration detection indicator for one or more locales can be stored in the memory 104 for further processing. In addition, the alteration detection indicator can be encoded, tagged, or labeled before, during, or after being stored in memory 104.

As can be appreciated from the disclosure, embodiments disclosed herein can improve operation of the processor 102. This can be achieved by implementing an algorithm that will improve efficiency of processor operation by requiring less iterations. For example, the algorithm causes the processor 102 to quickly and accurately process the digital image file in a more efficient manner (e.g., with less iterations). In addition, the processor 102 can, in some instances, determine that tampering occurred just by analyzing a minimal number of locales. Thus, a human operator, artificial intelligence, etc. can direct the processor 102 to likely locales for analysis to assess whether tampering occurred. If not, the processor 102 can continue to other less likely locales, and then even more less likely locales, etc. via a systematic approach. This operation alone, is a novel and non-conventional manner to efficiently detect an alteration to a digital image file. These improvements can yield higher precision, require less computational resources, require less processing steps, etc.

In some embodiments, instructions stored on the memory 104, when executed by the processor 102, can cause the processor 102 to determine a local variability for plural locales of a digital image file. The processor 102 can compare plural local variabilities and global variabilities, determine a local variability for each locale of a digital image file, compare an individual local variability to global variability for each individual locale, etc. Again, the size and number of locales to determine variability for will depend on design criteria, optimization factors, computational resources, processing speed, etc.

As noted above, a locale can be a zone of a digital image file that includes plural pixels. A local can be a zone of a digital image file that includes plural pixels in which at least two pixels are adjacent each other. For example, a local can be a zone comprising a 4×4 square area of pixels. The same applies to a "global" region; however, the "global" region used for comparison to a locale should be larger than the local. Again, the size and number of locales and "global" regions, which locales and "global" regions to use for the comparison, which locals and "global" regions to determine variability for, how to determine that variability, etc. will depend on design criteria, optimization factors, computational resources, processing speed, etc.

Local variability can include a measure of variability, a measure of change, a measure of variance, an entropy type measure, etc. Global variability can include a measure of variability, a measure of change, a measure of variance, an entropy type measure, etc. As noted herein, it is contemplated for the comparison of local variability to global variability to include dividing a local variability by a global variability. This can generate a local variability to global variability (LV/GV) ratio. The LV/GV ratio can be compared to a threshold value. The threshold value can be set to be an indicator of tampering in a locale.

Figure 3:
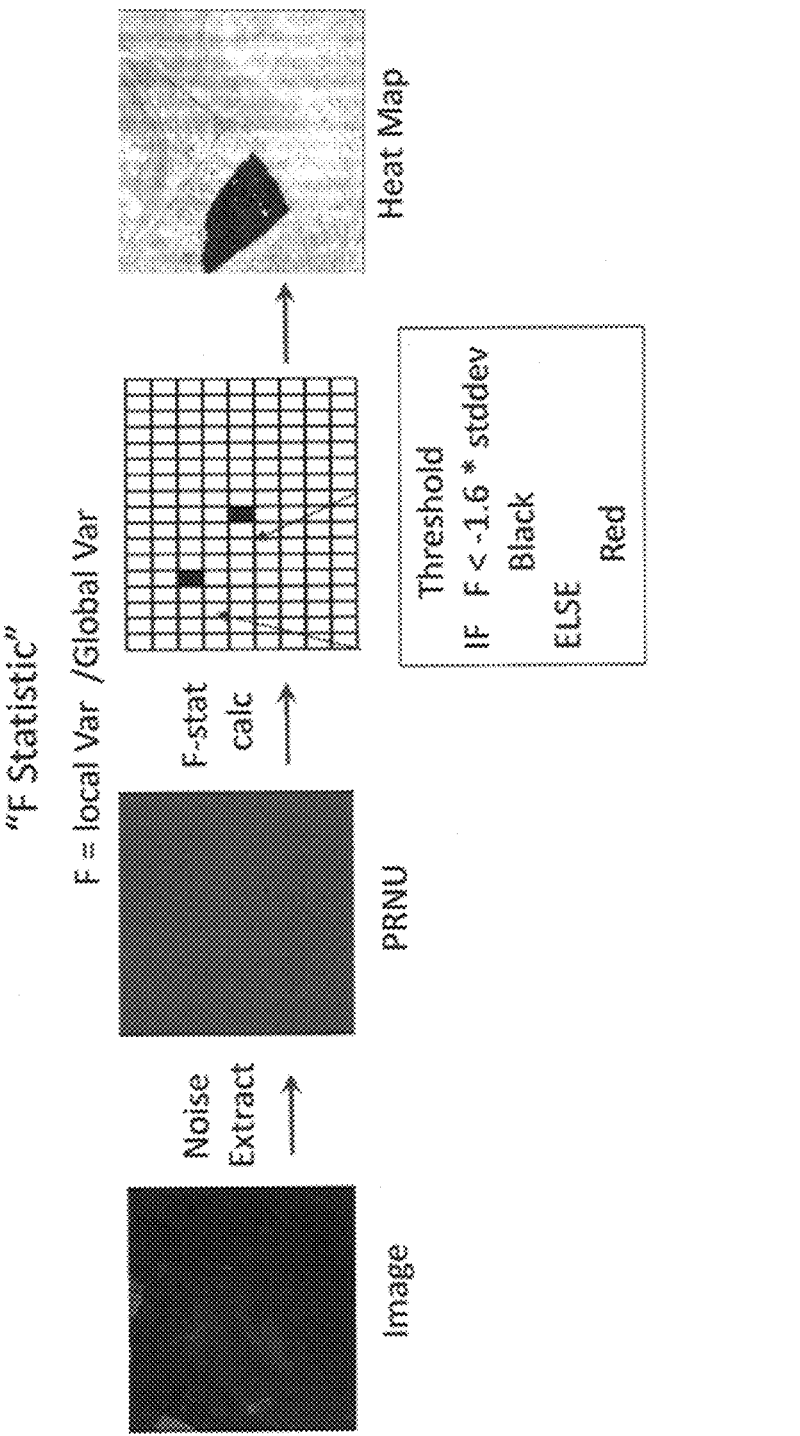
FIG. 3 shows an exemplary process for generating a heat map for a digital image file.

Referring to FIG. 3, in some embodiments, instructions stored on the memory 104, when executed by the processor

102, can cause the processor 102 to measure a central tendency and variance of signal strength from PRNU data. The central tendency and variance can be the measure of variability for the locale. In addition, there can be a central tendency and variance measure of variability for the "global" region. The threshold value can be a value or a bounded set of values based on a measured central tendency and variance in signal strength from PRNU data. As a non-limiting example, instructions can cause the processor 102 to measure a mean, a variance, and a standard deviation of signal strength from PRNU data. Instructions can cause the processor 102 to set a threshold value or bounded set of values based on a standard deviation in signal strength from PRNU data. As a non-limiting example, the threshold value can be 1.6 times the standard deviation of a signal strength of a locale, 1.6 times the standard deviation of a signal strength of plural locales, 1.6 times the standard deviation of a signal strength of a "global" region, 1.6 times the standard deviation of a signal strength of plural "global" regions, etc. For instance, if the LV/GV ratio for a locale is less than 1.6 times the standard deviation of a signal strength of PRNU data for the entire data image file, then this can be an indicator of tampering in the locale.

As noted herein, instructions stored on the memory 104, when executed by the processor 102, can cause the processor 102 to generate an alteration detection indicator indicative of an alteration detected when the local variability to global variability comparison is less than a threshold value. Instructions can also cause the processor to generate a no-alteration detection indicator indicative of no alteration detected for a locale when the local variability to global variability comparison is greater than or equal to a threshold value. The alteration detection indicator and/or the no-alteration detection indicator for one or more locales can be stored in the memory 104 for further processing. In addition, the alteration detection indicator and/or the no-alteration detection indicator can be encoded, tagged, or labeled before, during, or after being stored in memory 104.

Referring to FIGS. 3 and 4, in some embodiments, instructions stored on the memory 104, when executed by the processor 102, can cause the processor 102 to generate a heat map including a color-coded representation based on the alteration detection indicator and the no-alteration detection indicator. For instance, a heat map can present the image data file but with color coded pixels for the locales. For each locale in which tampering is detected, the alteration detection indicator corresponding (via the tagging or labeling discussed above) to that locale can be used as an indicator to present that locale as red. For each locale in which no tampering is detected, the no-alteration detection indicator corresponding to (via the tagging or labeling discussed above) that locale can be used as an indicator to present that locale as black. The entire digital image file can be reproduced but in color-coded fashion and displayed on a display 108. The display 108 can be a monitor in communication with a computer device 106, for example. Colors other than red and black can be used.

An exemplary embodiment can relate to a method for managing a processor configuration to efficiently detect an alteration to a digital image file. The method can involve extracting Photo Response Non-Uniformity (PRNU) data of a digital image file. The method can involve determining a local variability representing a variability in PRNU data for a locale of a digital image file. The method can involve determining a global variability representing a variability in PRNU data for an entire digital image file. The method can involve comparing a local variability to global variability. The method can involve generating an alteration detection indicator indicative of an alteration detected when the local variability to global variability comparison is less than a threshold value.

In some embodiments, the method can involve determining a local variability for plural locales of a digital image file.

In some embodiments, the method can involve comparing plural local variabilities and global variabilities.

In some embodiments, the method can involve determining a local variability for each locale of a digital image file.

In some embodiments, the method can involve comparing an individual local variability to global variability for each individual locale.

In some embodiments, the method can involve generating a no-alteration detection indicator (e.g., an electric signal, an audio signal, a visual signal, etc.) indicative of no alteration detected for a locale when the local variability to global variability comparison is greater than or equal to a threshold value.

In some embodiments, the method can involve generating a heat map including a color-coded representation based on the alteration detection indicator and the no-alteration detection indicator.

An exemplary embodiment can relate to a computer readable medium including instructions stored thereon that when executed by a processor 102 will cause the processor to efficiently detect an alteration to a digital image file. Instructions can cause the processor 102 to efficiently detect an alteration to a digital image file by extracting Photo Response Non-Uniformity (PRNU) data of a digital image file. Instructions can cause the processor 102 to efficiently detect an alteration to a digital image file by determining a local variability representing a variability in PRNU data for a locale of a digital image file. Instructions can cause the processor 102 to efficiently detect an alteration to a digital image file by determining a global variability representing a variability in PRNU data for an entire digital image file. Instructions can cause the processor 102 to efficiently detect an alteration to a digital image file by comparing a local variability to global variability. Instructions can cause the processor 102 to efficiently detect an alteration to a digital image file by generating an alteration detection indicator indicative of an alteration detected when the local variability to global variability comparison is less than a threshold value.

It will be understood that modifications to the embodiments disclosed herein can be made to meet a particular set of design criteria. For instance, any of the components, features, or steps of the apparatus, system, or method can be any suitable number or type of each to meet a particular objective. Therefore, while certain exemplary embodiments of the systems and methods disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiments. Thus, the components, features, and/or configurations of the various embodiments can be combined in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein. Additionally, the disclosure of a range of values is a disclosure of every numerical value within that range, including the end points.

What is claimed is:

1. A digital image file alteration detection controller which implements a processor configuration to efficiently detect an alteration to a digital image file, the digital image file alteration detection controller comprising:

a processor, and a memory associated with the processor, the memory including instructions stored thereon that when executed by the processor will cause the processor to:

extract Photo Response Non-Uniformity (PRNU) data of a digital image file received from the memory;

determine a local variability representing a variability in PRNU data for a locale of a digital image file;

determine a global variability representing a variability in PRNU data for an entire digital image file;

compare local variability to global variability; and generate an alteration detection indicator indicative of an alteration detected based on an evaluation of the local variability to global variability comparison.

2. The controller of claim 1, wherein:

instructions will cause the processor to determine a local variability for plural locales of a digital image file.

3. The controller of claim 2, wherein:

instructions will cause the processor to compare plural local variabilities and global variabilities.

4. The controller of claim 1, wherein:

instructions will cause the processor to determine a local variability for each locale of a digital image file.

5. The controller of claim 4, wherein:

instructions will cause the processor to compare an individual local variability to global variability for each individual locale.

6. The controller of claim 1, wherein:

a locale is a zone of a digital image file including plural pixels.

7. The controller of claim 1, wherein:

a local is a zone of a digital image file including plural pixels in which at least two pixels are adjacent each other.

8. The controller of claim 1, wherein:

local variability includes a measure of variability, a measure of change, a measure of variance, and/or an entropy type measure;

global variability includes a measure of variability, a measure of change, a measure of variance, and/or an entropy type measure;

compare local variability to global variability includes dividing a local variability by a global variability.

9. The controller of claim 1, wherein:

instructions will cause the processor to measure a central tendency and variance of signal strength from PRNU data; and instructions will cause the processor to set a threshold value or bounded set of values based on a central tendency and variance in signal strength from PRNU data.

10. The controller of claim 1, wherein:

instructions will cause the processor to measure a mean, a variance, and a standard deviation of signal strength from PRNU data; and instructions will cause the processor to set a threshold value or bounded set of values based on a standard deviation in signal strength from PRNU data.

11. The controller of claim 1, wherein:

instructions will cause the processor to generate a no-alteration detection indicator indicative of no alteration detected for a locale when the local variability to global variability comparison is greater than or equal to a threshold value.

12. The controller of claim 11, wherein:

instructions will cause the processor to generate a heat map including a color-coded representation based on the alteration detection indicator and the no-alteration detection indicator.

13. A method for managing a processor configuration to efficiently detect an alteration to a digital image file by:

extracting Photo Response Non-Uniformity (PRNU) data of a digital image file;

determining a local variability representing a variability in PRNU data for a locale of a digital image file;

determining a global variability representing a variability in PRNU data for an entire digital image file;

comparing a local variability to global variability; and generating an alteration detection indicator indicative of an alteration detected based on an evaluation of the local variability to global variability comparison.

14. The method of claim 13, comprising:

determining a local variability for plural locales of a digital image file.

15. The method of claim 14, comprising:

comparing plural local variabilities and global variabilities.

16. The method of claim 13, comprising:

determining a local variability for each locale of a digital image file.

17. The method of claim 16, comprising:

comparing an individual local variability to global variability for each individual locale.

18. The method of claim 13, comprising:

generating a no-alteration detection indicator indicative of no alteration detected for a locale when the local variability to global variability comparison is greater than or equal to a threshold value.

19. The method of claim 18, comprising:

generating a heat map including a color-coded representation based on the alteration detection indicator and the no-alteration detection indicator.

20. A non-transitory computer readable medium including instructions stored thereon that when executed by a processor will cause the processor to efficiently detect an alteration to a digital image file by:

extracting Photo Response Non-Uniformity (PRNU) data of a digital image file;

determining a local variability representing a variability in PRNU data for a locale of a digital image file;

determining a global variability representing a variability in PRNU data for an entire digital image file;

comparing a local variability to global variability; and generating an alteration detection indicator indicative of an alteration detected based on an evaluation of the local variability to global variability comparison.

* * * * *